(12) United States Patent
Newell

(10) Patent No.: US 6,621,599 B1
(45) Date of Patent: Sep. 16, 2003

(54) AUTO-WIDTH DETECTION USING BACKING IMAGE

(75) Inventor: John T. Newell, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 602 days.

(21) Appl. No.: 09/593,505

(22) Filed: Jun. 14, 2000

(51) Int. Cl.[7] .................. G01B 11/14; G03G 15/00; G06K 9/22; H04N 1/04; H04N 1/40
(52) U.S. Cl. .................. 358/474; 358/488; 358/449; 382/315; 399/376; 356/625
(58) Field of Search .................. 358/488, 449, 358/451, 462, 463, 464, 465, 466; 382/272, 175, 315; 399/376; 356/71, 625

(56) References Cited

U.S. PATENT DOCUMENTS 5,282,061 A * 1/1994 Farrell .................. 358/464
6,046,828 A * 4/2000 Feng et al. .................. 358/488
6,198,088 B1 * 3/2001 Seachman .................. 250/208.1

* cited by examiner

Primary Examiner—Edward Coles
Assistant Examiner—Jason Sherrill
(74) Attorney, Agent, or Firm—Oliff & Berridge, PLC

(57) ABSTRACT

Automatic detection of the width and position of a document which is substantially insensitive to dust and dirt as well as electrical noise is provided with an image capture device. When a document is staged for image capture, the image capture device collects several scanlines of the backing without the document and several scanlines of the lead edge of the document with the backing. The backing image collected is then subtracted from the lead edge image collected, and the resulting image is readjusted. Accordingly, variations in the backing areas of the lead edge image are removed and edge detection failure or error are reduced or eliminated.

15 Claims, 7 Drawing Sheets

AUTO-WIDTH DETECTION USING BACKING IMAGE

BACKGROUND OF THE INVENTION

1. Field of Invention

This invention relates to systems and methods for automatically detecting the width of a document using a backing image.

2. Description of Related Art

To provide an image processing apparatus with image data to process, the image data is often captured from original images using an image capture device, such as a scanner. The image capture device converts the various light and dark areas of the original image to a set of digital signals, and provides these digital signals to the image processing apparatus to be processed. These processed digital signals can then be used to operate an image output terminal, such as, for example, a printing apparatus.

SUMMARY OF THE INVENTION

In conventional image capture devices, the user must manually determine the document size and input the width to the image capture device before the image of the document is captured. The document must be centered to avoid clipping the output image.

This invention provides systems and method for automatically detecting a document's width and position when the document is being initially staged for image capture.

This invention separately provides systems and methods that provide automatic detection of the width and position of a document, where the detection is substantially insensitive to dust and dirt as well as electrical noise.

In various exemplary embodiments of the systems and method of this invention, it is not necessary for a user to manually determine the document size or center the document. In various exemplary embodiments of the systems and method of this invention, image capture is performed with an illuminating device and a photosensor. During image capture, the area surrounding the document has a different density from the body of the document, which permits the document's edges to be identified.

In various exemplary embodiments of the methods and systems of this invention, image processing routines are performed upon the image of the document and not upon the image data representing the backing, i.e., the area captured by the digital image capture device which is not the document or the desired image to be captured.

In various exemplary embodiments of the systems and method of this invention, when a document is staged for image capture, the image capture device collects several scanlines of the backing without the document and several scanlines of the lead edge of the document with the backing. The collected backing image is then subtracted from the collected lead edge image, and the resulting image is readjusted.

In various exemplary embodiments of the systems and method of this invention, variations in the backing areas of the lead edge image are removed and edge detection failures and/or errors are reduced or eliminated.

These and other features and advantages of this invention are described in or are apparent from the following detailed description of various exemplary embodiments.

BRIEF DESCRIPTION OF THE DRAWINGS

Various exemplary embodiments of this invention will be described in detail, with reference to the following figures, in which.

DETAILED DESCRIPTION OF PREFERRED EMBODIMENTS.

Detecting left and right document edges is difficult because there are many sources of variation. Although a backing should have constant reflectance, dirt and dust can get caught in the imaging plane, for example. A photosensor also has varying response due to element-to-element variation, optics, and systems noise. Because the backing is stationary, dust particles and dirt on the backing can appear in the image as vertical dark streaks. Some document types, such as film and bond paper, have reflectances similar to that of the backing. Dark documents cause a reflectance gradient to form near the document edges documents, causing edges to appear as ramps. Dust particles cause spurious jumps that appear similar to the edge of the film or bond paper. Element-to-element variation in the photosensor, along with system noise, cause reflectance variations that mask edges. Finally, the detection must be robust against device-to-device manufacturing variations. These factors confound attempts to detect edges based on jumps in reflectance.

Figure 1:
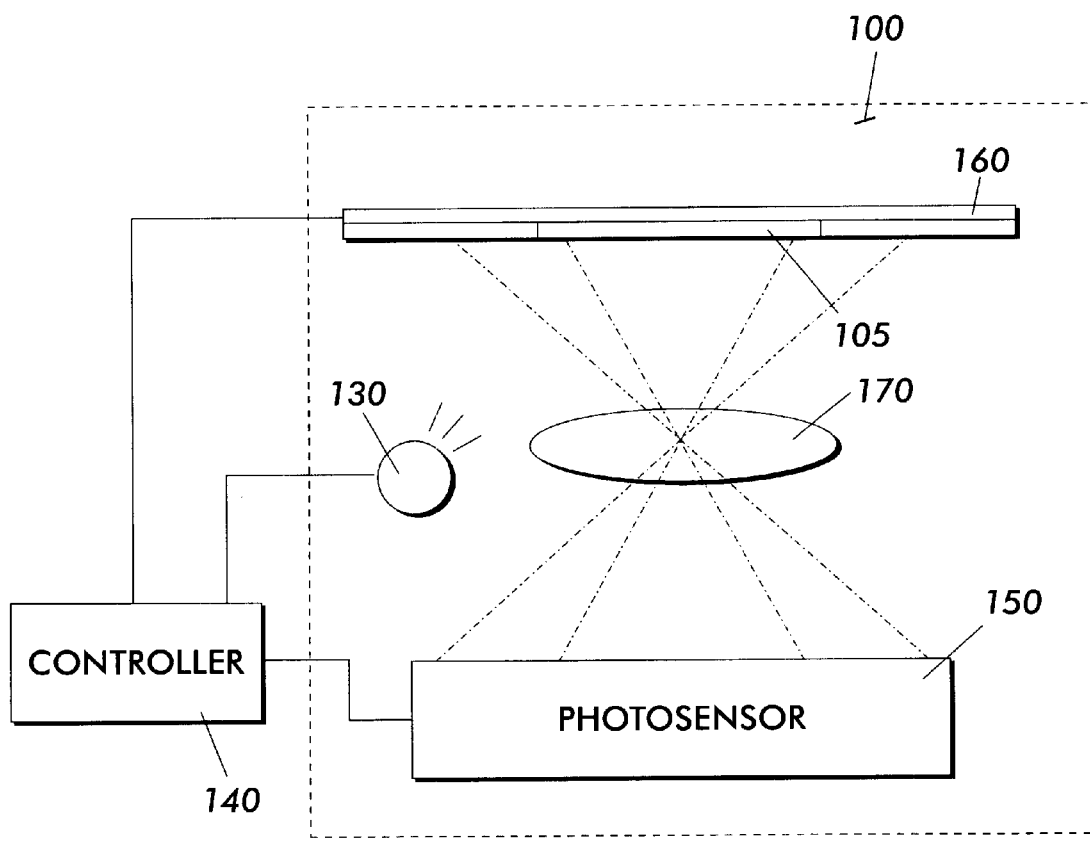
FIG. 1 shows one exemplary embodiment of an image capture device according to this invention.

FIG. 1 shows one exemplary embodiment of the image capture device 100 according to this invention. As shown in FIG. 1, the image capture device 100 includes a document illuminator 130, a controller 140, a photosensor 150, a backing 160 and an image capture lens 170.

Figure 2:
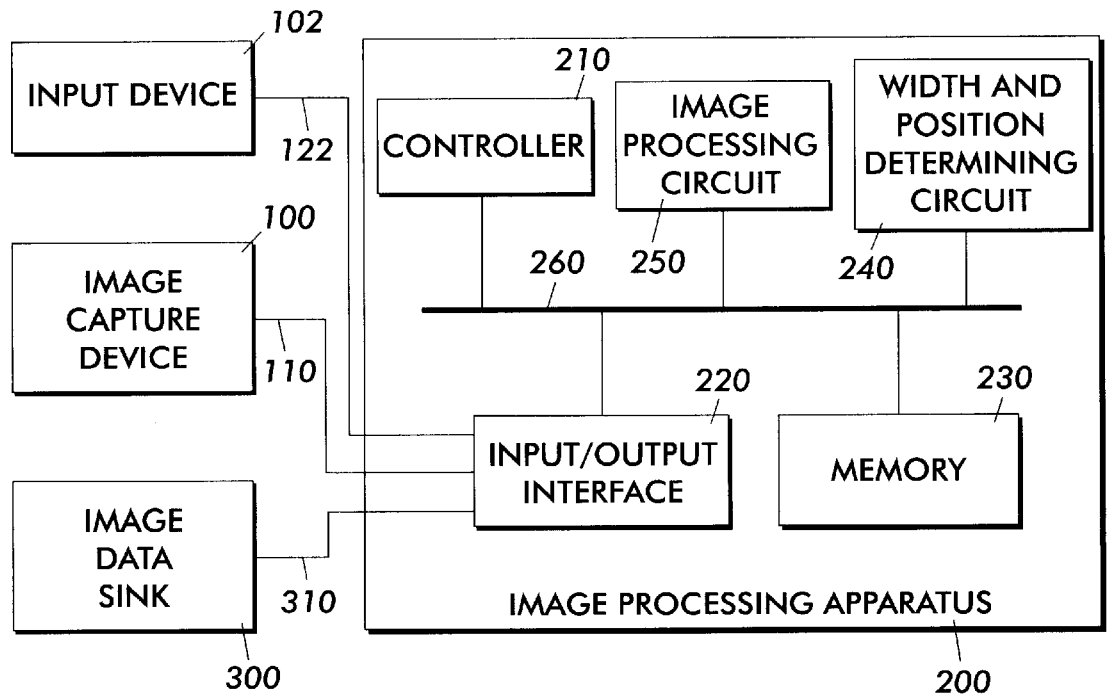
FIG. 2 shows one exemplary embodiment of a system that includes an image processing apparatus and the image capture device of FIG. 1.

The document illuminator 130 is controlled by the controller 140. When the document illuminator 130 is in an active state, the controller 140 controls the photosensor 150 to pick up an image the backing 160 and a document 105. Using the data thus obtained by the photosensor 150, an image processing apparatus 200, as shown in FIG. 2, is able to generate a document map of the document 105. This document map may indicate, for example, the size, location and/or orientation of the document 105. It may also indicate the location, shape, and/or size of transparent portions of the document 105, such as document holes including punched holes, holes caused by tearing of the document, staple holes, tom-off corners of the document 105, and/or the like.

When the document illuminator 130 is activated, the controller 140 causes the photosensor 150 to pick up an image of the document 105. More specifically, the photosensor 150 senses light reflected from the document 105 and from the exposed portion of the backing 160.

The backing 160 may, for example, be a white sheet or roll. The backing 160 may be any material that diffusely reflects light from the document illuminator 130, described below.

In various exemplary embodiments, the image capture device 100 provides a surface that reflects white light such that the reflected light may be sensed by the photosensor 150.

Although one exemplary structure of the image capture device 100 has been illustrated, it should be appreciated that variations and modifications may be made to the illustrated structure while still accomplishing this purpose. For example, the image capture device 100 could be a platen cover assembly, where the backing 160 is the backing of the platen cover. Furthermore, the image capture device 100 could be a document feeding system, such as a constant velocity transport system, where the backing 160 is a backing roll.

A document 105 is placed within the image capture device 100 between the document illuminator 130 and the photosensor 150. The backing 160 presses the document 105 to a transparent platen, for example, to set the document 105 in place. It should be appreciated that the document illuminator 130 may be provided separately from the image capturing device 100.

The image capture lens 170 collects light reflected from the document 105 and the exposed part of the backing 160 when the document illuminator 130 is activated. The image capture lens 170 produces an image of the document 105 and the exposed part of the backing 160 on the photosensor 150. That is, the size, location, and/or orientation of the document 105 can be detected from the image captured by the photosensor 150 and converted to a corresponding electrical signal image. Processing, such as deskewing, registering, and/or resizing of the captured image data for a copy that is made from the original document 105 can be performed by either or both of the image processing apparatus 200 and/or an image data sink 300, as described below, using conventional image processing algorithms, once the size, location, and/or orientation of the document 105 is known.

In various other exemplary embodiments of the image capture and processing systems and method of this invention, when the document 105 is staged for image capture, a small number of scanlines of the backing 160 are captured by the photosensor 150, before the document 105 is scanned using the photosensor 150, to obtain a first reading. Afterward, the photosensor 150 captures the lead edge of the backing 160 and the document 105 to obtain a second reading.

During image capture, the document 105 is moved relative the photosensor 150. The light from the document illuminator 130 that has been reflected from the document 105 and the backing 160 passes through the image capture lens 170. The image capture lens 170 focuses the reflected light on the photosensor 150. In various exemplary embodiments, the image capture lens 170 focuses the reflected light with respect to an optical center line. The reflected image of the document 105, as well as the image of the backing 160, are converted by the photosensor 150 into pixels of image data. The data signals from the photosensor 150 representing the pixels of usage data are sent to the image processing apparatus 200 for determining the width and the position of the document 105.

In accordance with the systems and method of this invention, the effects from variance of the backing 160 due to dust or dirt, for example, may be obviated by subtracting the image of the backing 160 from the image of the backing 160 with the document 105. Thus, the differences in texture between the backing 160 and the document 105 can be increased to determine edges. Because the image of the backing 160 is captured directly before each document image 105 is captured, various exemplary embodiments of the methods according to this invention adapt to scan-toscan differences in the dirt, dust and device noise.

FIG. 2 shows one exemplary embodiment of a system that includes an image processing apparatus 200 incorporating the automatic width and position detection techniques in accordance with this invention. As shown in FIG. 2, the image capture device 100 and an input device 102 are connected to the image processing apparatus 200 over links 110 and 122, respectively. Similarly, an image data sink 300 can be connected to the image processing apparatus 200 over a link 310.

The image capture device 100 can be a digital camera, a scanner, or any other known or later developed device that is capable of capturing and image and generating electronic image data that has been captured according to the image capture techniques described above. Similarly, the image capture device 100 can be any suitable device that stores and/or transmits electronic image data such as a client or a server of a network that has been captured according to the image capture techniques described above.

The image capture device 100 can be integrated with the image processing apparatus 200, as in a digital copier having an integrated scanner. Alternatively, the image capture device 100 can be connected to the image processing apparatus 200 over a connection device, such as a modem, a local area network, a wide area network, an intranet, the Internet, any other distributed processing network, or any other known or later developed connection device.

It should also be appreciated that, while the electronic image data can be generated at the time of printing an image from electronic image data, the electronic image data could have been generated at any time in the past. The image capture device 100 is thus any known or later developed device that is capable of supplying electronic image data that has been captured according to the image capture techniques described above over the link 110 to the image processing apparatus 200. The link 110 can thus be any known or later developed system or device for transmitting the electronic image data from the image capture device 100 to the image processing apparatus 200.

The input device 102 can be any known or later developed device for providing control information from a user to the image processing apparatus 200. Thus, the input device 120 can be a control panel of the image processing apparatus 200, or a control program executing on a locally or remotely located general purpose computer or the like. As with the link 110 described above, the link 122 can be any known or later developed device for transmitting control signals and data input using the input device 120 from the input device 102 to the image processing apparatus 200.

The image data sink 300 can be any known or later developed device that can receive the reconstructed composite image from the image processing apparatus 200. Thus, the image data sink 300 can be a display, an image data sink such as a laser printer, a digital copier, an inkjet printer, a dot matrix printer, a dye sublimation printer, or the like. The image data sink 300 can also be any known or later developed storage device, such as a floppy disk and drive, a hard disk and drive, a writeable CD-ROM or DVD disk and drive, flash memory, or the like. It should also be appreciated that the image data sink 300 can be located locally to the image processing apparatus 200 or can be located remotely from the image processing apparatus 200. Thus, like the links 110 and 122, the link 310 can be any known or later developed connection system or structure usable to connect the image processing apparatus 200 to the image data sink 300. Specifically, the link 310 can be implemented using any of the devices or systems described above with respect to links 110 and 122.

In general, the image data sink 300 can be any known or later developed device that is capable of receiving data output by the image processing apparatus 200 and either storing, transmitting or displaying the data. Thus, the image data sink 300 can be either or both of a channel device for transmitting the data for display or storage or a storage device for indefinitely storing the data until there arises a need to display or further transmit the data.

The channel device can be any known structure or apparatus for transmitting data from the image processing apparatus 200 to a physically remote storage or display device. Thus, the channel device can be a public switched telephone network, a local or wide area network, an intranet, the Internet, a wireless transmission channel, any other distributing network, or the like. Similarly, the storage device can be any known structural apparatus for indefinitely storing image data such as a RAM, a hard drive and disk, a floppy drive and disk, an optical drive and disk, a flash memory or the like. For example, the image data sink 300 may be a printer, a facsimile machine, a digital copier, a display, a host computer, a remotely located computer, or the like.

As shown in FIG. 2, the image processing apparatus 200 includes a controller 210, an input/output interface 220, a memory 230, a width and position determining circuit or routine 240 and an image processing circuit or routine 250, each of which is interconnected by a control and/or data bus 260. The links 110, 122 and 310 from the image capture device 100, the input device 120, and the image data sink 300, respectively, are connected to the input/output interface 220. The electronic image data from the image capture device 100 and any control and/or data signals from the input device 120 are input through the input interface, and, under control of the controller 210, are stored in the memory 230.

The memory 230 preferably has at least an alterable portion and may include a fixed portion. The alterable portion of the memory 230 can be implemented using static or dynamic RAM, a floppy disk and disk drive, a hard drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a writable optical disk and disk drive, or any other known or later developed fixed memory device.

The width and position determining circuit 240 inputs signals received from the image capture device 100. The width and position determining circuit 240 then determines the width and position of the document from the captured image and processes the image data in accordance with the detected width and position to separate the actual image data corresponding to the original document from the other image data captured by the image capture device 100 with the image data of the original document 105. Alternatively, the width and position determining circuit or routine 240 can merely output data which defines the bounds of the original image data corresponding to the original document, to the image processing circuit or routine 250. The image processing circuit or routine 250 then removes the other image data from the captured image data, to leave only the original image data, based on the data from the width and position determining circuit or routine 240.

The processed image data is outputted from the image processing apparatus 200 to the image data sink 300 over the link 310. The image processing circuit 250 can also process the original image data to apply any other known or later developed image processing technique. Accordingly, when the processed original image data is output to the image data sink 300, the resulting image can be substantially centered and registered on a receiving substrate or display.

The image processing apparatus 200 shown in FIG. 2 is connected to the image data sink 300 over the link 310. Alternatively, the image output terminal 300 may be an integral part of the image processing apparatus 200. An example of this alternative configuration would be a digital copier or the like. It should be appreciated that the image processing apparatus 200 can be any known or later developed type of image processing apparatus. There is no restriction on the form the image processing. apparatus 200 can take.

The links 110, 122 and 310 can be any known or later developed device or system for connection, including a direct cable connection, a connection over a wide area network or a local area network, a connection over an intranet, a connection over the Internet, or a connection over any other distributed processing network or system. In general, the links 110 and 122 can be any known or later developed connection system or structure usable for connection.

As indicated above, the image data sink 300 may be an integrated device with the image processing apparatus 200, such as a digital copier, computer with a built-in printer, or any other integrated device that is capable of producing a hard copy image output. With such a configuration, for example, the image data sink 300 and the image processing apparatus 200 may be contained within a single)device. For example, in the case of a digital copier, the image processing apparatus 200 and the image data sink 300 may be provided in the same machine. As another example, the image processing apparatus 200 and the image data sink 300, for example a printer or a computer memory, may be physically separate.

After being processed by the image processing apparatus 200, the image data is output to the image data sink 300. The data may be stored in the memory before, during and/or after processing by the image processing apparatus 200, as necessary.

It should be understood that various components of the image processing apparatus 200 shown in FIG. 2, such as the width and position determining circuit or routine 240, the image processing circuit or routine 250, and the controller 210, can each be implemented as software executed on a suitably programmed general purpose computer, a special purpose computer, a microprocessor or the like. In this case, these components can be implemented as one or more routines embedded in a printer driver, as resources residing on a server, or the like. Alternatively, these components can be implemented as physically distinct hardware circuits within an ASIC, or using an FPGA, a PDL, a PLA, or a PAL, or using discrete logic elements or discrete circuit elements. The particular form each of the components shown in FIG. 2 will take is a design choice and will be obvious and predictable to those skilled in the art.

In one exemplary embodiment of this invention, the width and position determining circuit or routine 240 or the image processing circuit 250, is able to determine the histogram of the image data as well as the background values. From this histogram data, the width and position determination circuit or routine 240 determines the mean values for each column of pixels and the standard deviation. The width and position determination circuit or routine 240 then determines the physical edge and position of the document 105 to be captured from this mean and standard deviation determination. An exemplary method of determining the mean and standard deviation is described in copending U.S. Pat. No. 08/814050 incorporated herein by reference in its entirety.

Figure 3:
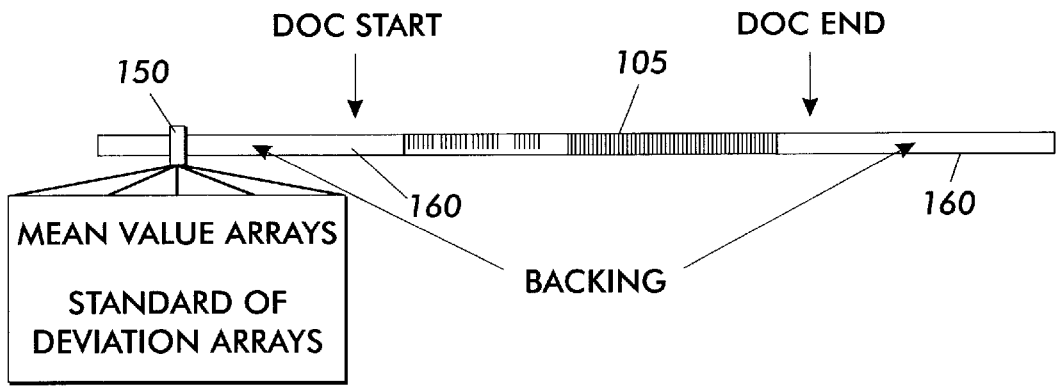
FIG. 3 illustrates a typical lead edge image captured during document staging.

FIG. 3 illustrates a typical lead edge image captured during document staging. As illustrated in FIG. 3, the lead edge of the document 105 is captured, where the image data represents both the reflected image of the backing 160 and the actual document 105. As shown in FIG. 3, the width and position of the document 105 can be determined by determining whether each photosensor element of the photosensor 150 receives image data of the backing 160 or the document 105. That is, each pixel in the lead edge image is classified as either image data of the backing 160 or image data of part of the document 105. Since the backing 160 has variance due to dust and dirt, the position and width determining systems and methods according to this invention reduces this problem.

Figure 4:
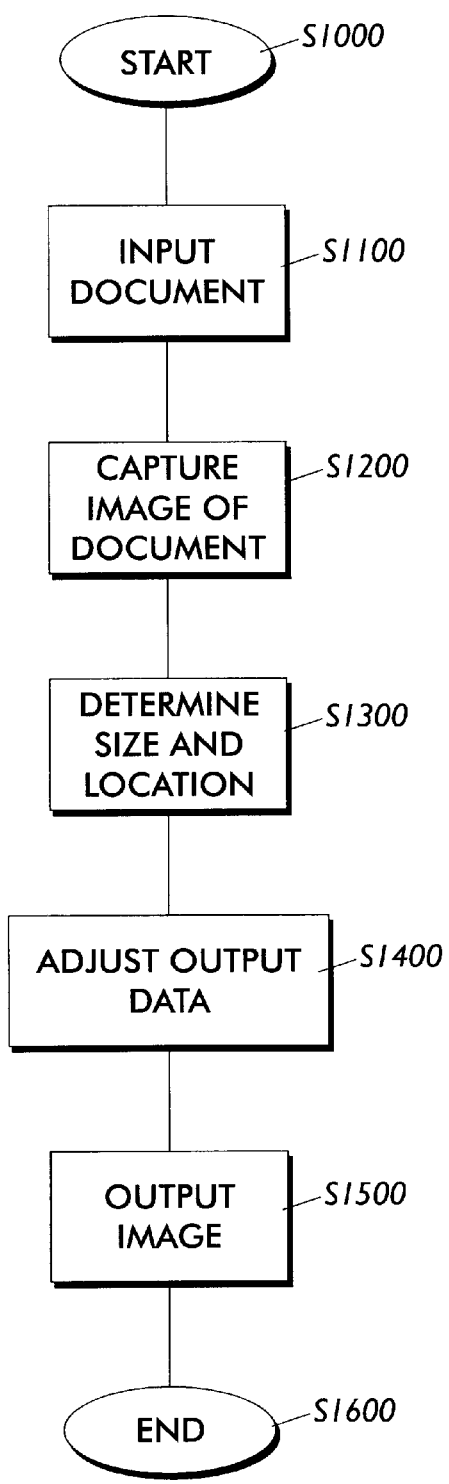
FIG. 4 is a flowchart outlining one exemplary embodiment of a method for processing an image according to this invention.

FIG. 4 is a flowchart outlining an image processing method according to this invention. Beginning at step S1000, control continues to step S1100, where the document is input. Then, in step S1200, an image of the document is captured. Next, in step S1300, the size and location of the document is determined based on the captured image. Control then continues to step S1400.

Figure 5:
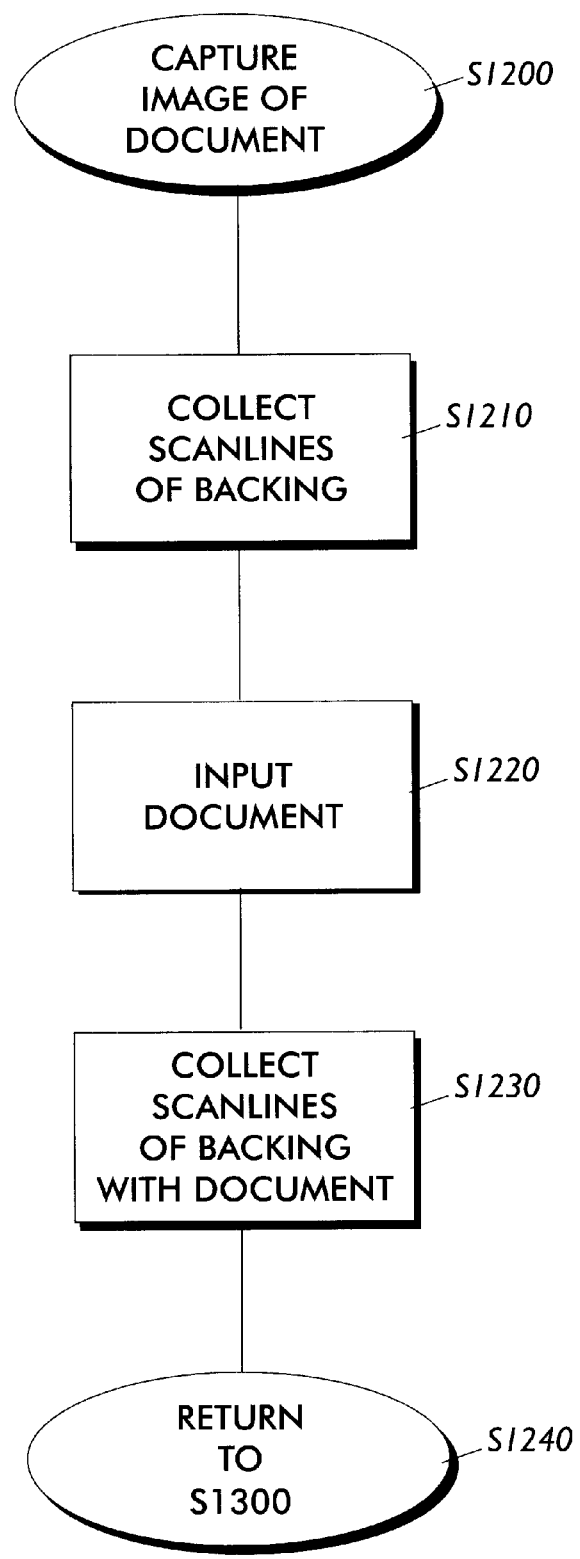
FIG. 5 is a flowchart outlining one exemplary embodiment of the image capturing step of FIG. 4.

In step S1400, the captured image data is adjusted to keep only the original image data and to discard the backing image data based on the determined document size and location. Next, in step S1500, only the original image data image is output as the output data. Then, in step S1600, the process stops. FIG. 5 is a flowchart outlining one exemplary embodiment of the image capturing step S1200. Beginning in step S1200, control continues to step S1210, where a plurality of scanlines of a backing is collected. That is, an image of the backing is captured by collecting a small number of scanlines before the document is moved on the imaging plane. Then, in step S1220, the document is input. Next, in step S1230, a plurality of scanlines of the document with the backing is collected. Control then continues to step S1240, where the control routine returns to step S1300, where the image captured is used as input for size and location detection, for example.

Figure 6:
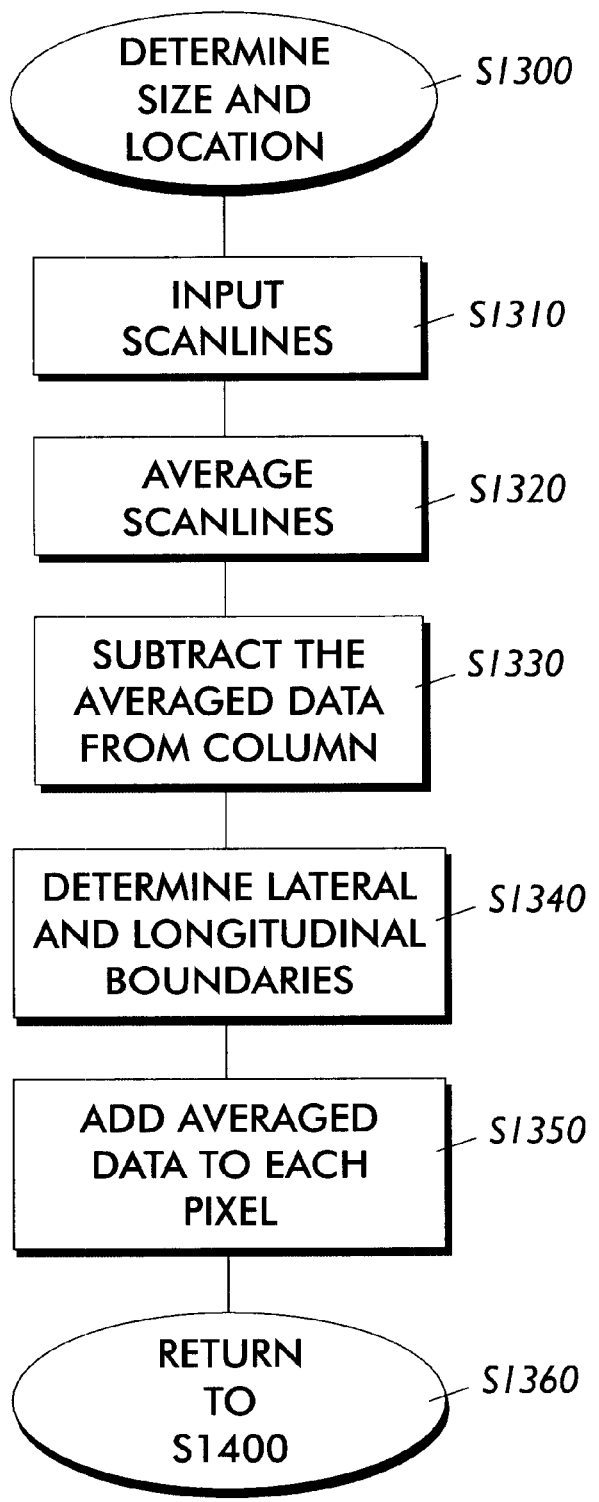
FIG. 6 is a flowchart outlining one exemplary embodiment of the size and location determining step of FIG. 4.

FIG. 6 is a flowchart outlining one exemplary embodiment of the size and location determining step S1300. Beginning in step S1300, control continues to step S1310, where the captured image for the backing and the captured image for the document with the backing are input. That is, the collected number of scanlines before the document is moved onto the imaging plane and the collected number of scanlines after the document is moved onto the imaging plane are input. Then, in step S1320, the scanlines of each captured column before the document is moved onto the imaging plane are averaged. That is, by averaging these scanlines of the backing together, the device noise variation for each pixel column may be reduced. Next, in step S1330, using the collected plurality of scanlines of the document with the backing, the averaged data is subtracted from each column collected of the document plus backing. Control then continues to step S1340.

In step S1340, the document-minus-averaged-backing image is analyzed to determine the lateral and longitudinal boundaries, corresponding to the scanned document, of the document image portion of the document-minus-averaged-backing image. That is, the document-minus-averaged-backing image is analyzed to determine the width and position of the document image portion. Then, in step S1350, the averaged data is added to each pixel in the document image portion. That is, the overall backing image average is added back to each pixel in the document image portion to preserve the mean level of the document image portion captured from the document. Control then continues to step S1360, where the control routine returns to step S1400.

In various exemplary embodiments of the method outlined above, for each column, the standard deviation is also determined along with the mean. For the photodetector elements covered by the backing, the standard deviation is the photodetector electronic noise, since the backing is stationary during the scan. But for the photodetector elements covered by the document, because the document moves relative to the photodetector during image capturing, the standard deviation includes both photodetector electronic noise and the document brightness variation. The document brightness variation is, in most case, must larger than the photosensor electronic noise. The standard deviation is more robust against dirt or dust on the backing. A further description of the standard deviation is set forth in the copending U.S. Pat. No. 08/814,050, incorporated herein by reference in its entirety.

If the backing image is not removed from the captured image data, i.e., the captured image data of the document with the backing, dirt particles on the backing will significantly reduce the mean value. The photodetector noise is still the same because it sees the same spot during the scan, and the photodetector electronic noise has a very weak dependency on the brightness level. When the backing image is removed from the captured image data, the variation of the mean in backing areas decreases since the stationary dirt and dust noise is removed. However, when the backing image is removed from the captured image data, the variation of the mean in the document areas increases. This occurs because the inverted image of the backing behind the document is essentially being added by removing the backing from an image that does not contain the backing.

Figure 7:
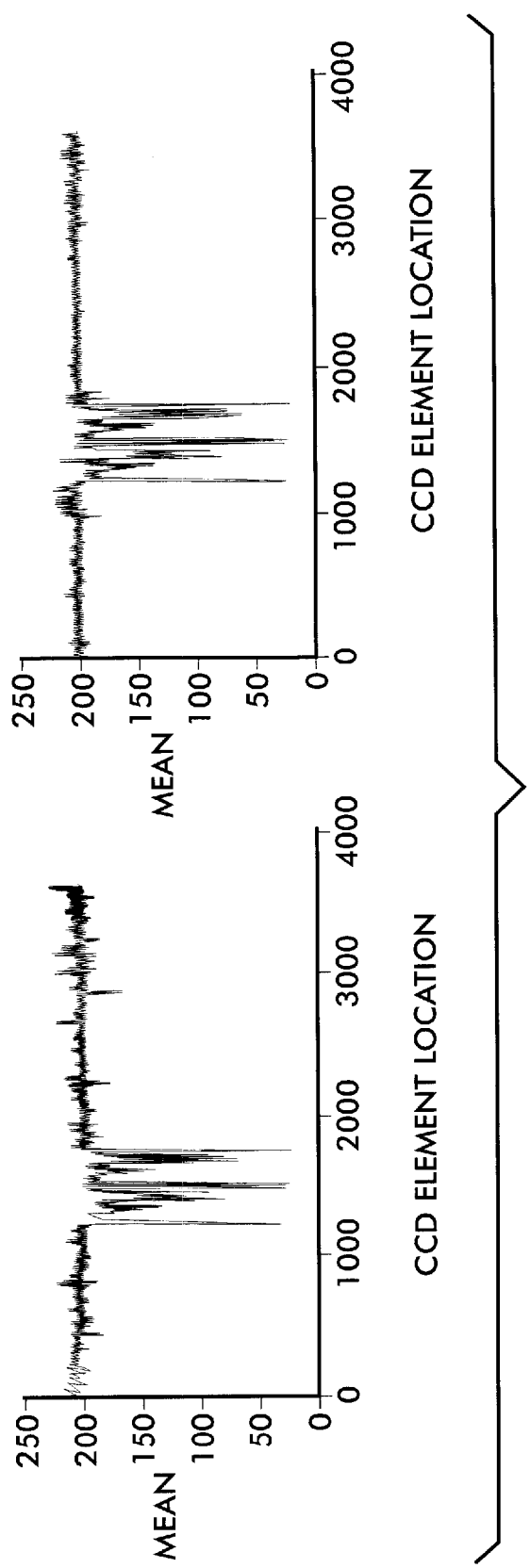
FIG. 7 shows one exemplary embodiment of a document prescan.

FIG. 7 shows an exemplary embodiment of a mean of an unmodified prescan of a document prescan on the left and a mean of the same prescan which has been modified by subtracting the average image of the backing. As shown in FIG. 7, the left edge of the document is located at CCD element 997. The right edge of the document is located at CCD element location 1847. The largest negative streaks are black text on the document, for example. Both the positive and negative streaks in the backing areas have been significantly reduced in magnitude. The residual variation in the backing areas is mainly due to the photodetector variance.

Figure 8:
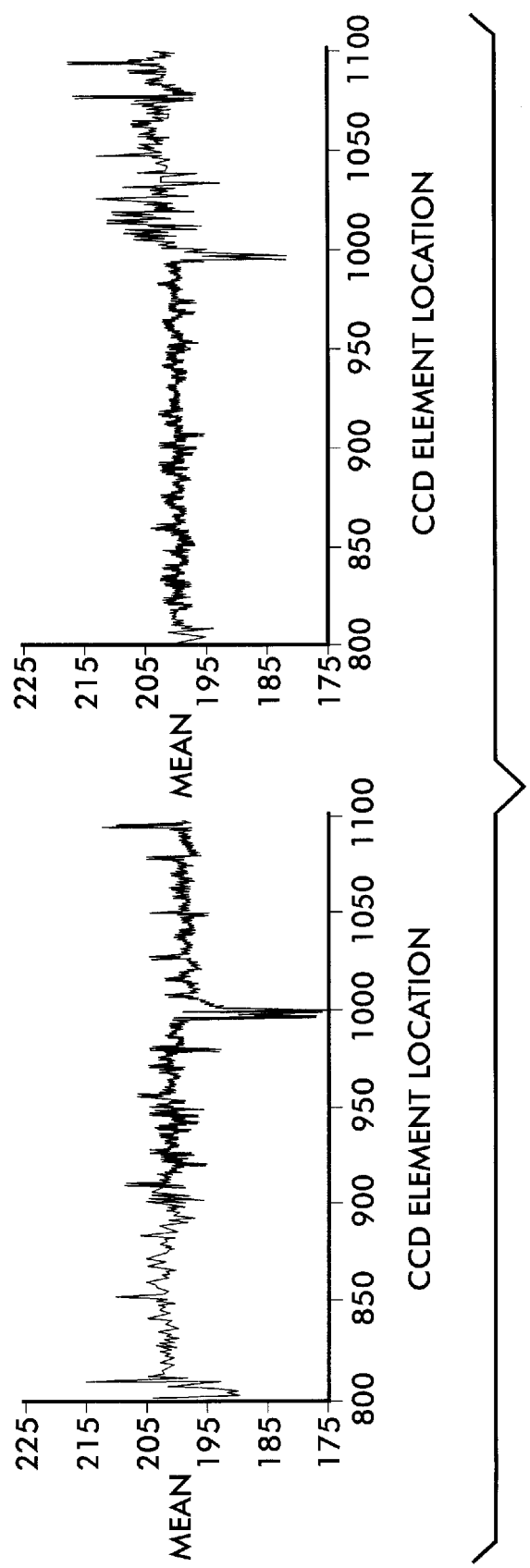
FIG. 8 shows a detailed view of the document prescan of FIG. 7.

FIG. 8 shows a detailed view of the left edge of the two mean arrays shown in FIG. 7. As shown in FIG. 8, the left edge of the document is also located at CCD element 997. Variation in the backing areas has been significantly reduced in magnitude. Also, the variation in the document areas has been significantly increased. Although the mean levels of the backing roll and the document are very similar, the difference in the mean variance between the backing and the document distinguishes the areas. Accordingly, the variation in the backing areas is reduced, and the edges of the documents are more determinable.

It should be appreciated that removing the backing image from the document image may be done by any appropriate known or later developed method. For example, if the backing is stationary and the document is pulled past the backing, the average backing image can be determined and subtracted from each pixel as described above. Alternatively, the averaged backing image could be subtracted from the mean and the overall backing image.

Furthermore, if the backing is not stationary, but moves with the document, the backing image is also not stationary. In this case, dirt on the backing would not result in vertical streaks on the backing image, but instead would appear as small dark spots. In this case, averaging several scanlines of the backing image and subtracting from the image capture of the document with the backing is not suitable. Thus, to remove the backing image in this case, a full width capture of the backing is done before capturing the document image with the backing. This can be done before the document is input or directly after the last document is captured. By keeping track of the backing position, the capture position for the document can be set to capture generally the same area as the captured backing image alone. The 2D image of the backing can then be subtracted from the 2D image of the document with the backing.

As shown in FIG. 2, the image processing apparatus 200 is preferably implemented on a programmed general purpose computer. However, the image processing apparatus 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIG. 4, can be used to implement the image processing apparatus 200.

The foregoing description of the exemplary systems and methods for width and position detection of this invention is illustrative, and variations in implementation will be apparent and predictable to persons skilled in the art. For example, while the systems and methods of this invention have been described with reference to desktop-captured images, any other type of image sensing device requiring accurate registration of a sequence of images can be used in conjunction with the systems and methods of this invention, such as portions of satellite or robotic images.

Thus, while the systems and methods of this invention has been described in conjunction with the specific embodiments outlined above, it is evident that many alternatives, modifications and variations will be apparent to those skilled in the art. Accordingly, the exemplary embodiments of the systems and methods of this invention, as set forth above, are intended to be illustrative, not limiting. Various changes may be made without departing from the spirit and scope of the invention.

What is claimed is:

1. A method for an image capturing device having a backing, a document being input onto the backing of the image capturing device, the method comprising:

collecting a plurality of scanlines of the backing without the document;

inputting the document onto the backing;

collecting a plurality of scanlines of the document with the backing;

determining size and location of the document based on the collected scanlines of the backing without the document and the collected scanlines of the document with the backing.

2. The method of claim 1, further comprising:

averaging the scanlines of the backing without the document to obtain averaged data.

3. The method of claim 2, further comprising:

subtracting the averaged data from the collected scanlines of the document with the backing to obtain subtracted data.

4. The method of claim 3, wherein the averaged data is subtracted from each column of the collected scanlines of the document with the backing.

5. The method of claim 3, further comprising:

adding the averaged data to the subtracted data after determining the size and location of the document.

6. The method of claim 5, wherein an overall backing average is added to each pixel of the document.

7. The method of claim 1, wherein determining the size and location of the document is based upon lateral and longitudinal boundaries of the document on the backing.

8. An image capture device having a backing, a document being input onto the backing, the image capturing device comprising:

a scanline collector that collects a plurality of scanlines of the backing without the document and that collects a plurality of scanlines of the document with the backing;

a determination circuit that determines size and location of the document based on the collected scanlines of the backing without the document and the collected scanlines of the document with the backing.

9. The image capture device of claim 8, further comprising:

an averaging circuit that averages the scanlines of the backing without the document to obtain averaged data.

10. The image capture device of claim 9, further comprising:

a subtracting circuit that subtracts the averaged data from the collected scanlines of the document with the backing to obtain subtracted data.

11. The image capture device of claim 10, wherein the averaged data is subtracted from each column of the collected scanlines of the document with the backing.

12. The image capture device of claim 10, further comprising:

an adding circuit that adds the averaged data to the subtracted data after determining the size and location of the document.

13. The image capture device of claim 12, wherein an overall backing average is added to each pixel of the document.

14. The image capture device of claim 8, wherein the determination circuit determining the size and location of the document is based upon lateral and longitudinal boundaries of the document on the backing.

15. The image capture device of claim 8, further comprising:

a document illuminator that illuminates the document and the backing;

an image capture lens that collects light reflected from the document and the backing when the document illuminator is activated; and a photosensor, wherein the image capture lens produces an image on the photosensor.

* * * * *